US010836668B2

(12) United States Patent
Mastek et al.

(10) Patent No.: US 10,836,668 B2
(45) Date of Patent: Nov. 17, 2020

(54) FURNACE SYSTEM

(71) Applicant: Owens-Brockway Glass Container Inc., Perrysburg, OH (US)

(72) Inventors: Witold Mastek, Waterville, OH (US); Bruce Gunner, Maumee, OH (US); Jeff Alexander, Beverly, MA (US); Michele Furlan, Chions (IT)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 200 days.

(21) Appl. No.: 15/879,250

(22) Filed: Jan. 24, 2018

(65) Prior Publication Data
US 2019/0225526 A1  Jul. 25, 2019

(51) Int. Cl.
| | |
|---|---|
| C03B 5/00 | (2006.01) |
| F27D 3/00 | (2006.01) |
| F27D 17/00 | (2006.01) |
| C03B 3/00 | (2006.01) |
| C03B 3/02 | (2006.01) |
| C03B 5/16 | (2006.01) |
| F27B 3/18 | (2006.01) |

(52) U.S. Cl.
CPC .............. *C03B 5/005* (2013.01); *C03B 3/00* (2013.01); *C03B 3/023* (2013.01); *C03B 5/16* (2013.01); *F27B 3/18* (2013.01); *F27D 3/0033* (2013.01); *F27D 17/00* (2013.01); *F27D 17/004* (2013.01); *F27D 2003/0065* (2013.01)

(58) Field of Classification Search
CPC .. C03B 5/005; C03B 3/00; C03B 3/02; C03B 3/023
See application file for complete search history.

(56) References Cited

U.S. PATENT DOCUMENTS

| | | | |
|---|---|---|---|
| 2,965,086 A | * 12/1960 | Gregory | F02M 5/08 |
| | | | 123/517 |
| 3,185,554 A | 5/1965 | Sweo et al. | |
| 4,277,277 A | * 7/1981 | Propster | C03B 3/00 |
| | | | 65/136.2 |
| 4,310,342 A | 1/1982 | Richards | |

(Continued)

FOREIGN PATENT DOCUMENTS

EP      2404880 A1     1/2012

OTHER PUBLICATIONS

PCT Search Report and Written Opinion, Int. Serial No. PCT/US2019/013763, Int. Filing Date: Jan. 16, 2019, Applicant: Owens-Brockway Glass Container Inc., dated Apr. 25, 2019.

*Primary Examiner* — Queenie S Dehghan

(57) ABSTRACT

A furnace system includes a mixing chamber that receives separate streams of raw material and cullet mix and discharges a combined stream. The mixing chamber tapers from an inlet end to an outlet end. One inlet in the inlet end is configured to receive one of the material and mix and is aligned with an outlet in the outlet end along a vertical axis. Another inlet is configured to receive the other of the material and mix and is offset from the outlet relative to the vertical axis such the material or mix is deposited on a sidewall of the tapered chamber before reaching the outlet. A charger receives the combined stream from the mixing chamber and discharges the mixture into a molten bath in a furnace. A duct system may be used to mix exhaust from the furnace with exhaust from the mixing chamber and charger.

21 Claims, 2 Drawing Sheets

(56) References Cited

U.S. PATENT DOCUMENTS

| | | | |
|---|---|---|---|
| 4,330,315 | A | 5/1982 | Nelson et al. |
| 4,353,726 | A | 10/1982 | Rough, Sr. |
| 4,368,676 | A | 1/1983 | Henriksen et al. |
| 4,481,025 | A | 11/1984 | Rodriguez et al. |
| 5,123,942 | A | 6/1992 | Argent et al. |
| 5,352,258 | A * | 10/1994 | DeGreve .................. C03B 3/00 65/134.4 |
| 5,522,007 | A | 5/1996 | Drouart et al. |
| 5,954,851 | A | 9/1999 | Sakae |
| 7,866,189 | B2 | 1/2011 | Saitou et al. |
| 8,056,366 | B2 | 11/2011 | Kobayashi et al. |
| 8,707,740 | B2 | 4/2014 | Huber et al. |
| 2003/0217763 | A1* | 11/2003 | Chang .................. B08B 9/0436 134/18 |
| 2005/0246920 | A1* | 11/2005 | Yabuuchi ................ D06F 58/02 34/515 |
| 2007/0227191 | A1 | 10/2007 | Kobayashi et al. |
| 2013/0167587 | A1 | 7/2013 | Lindig et al. |
| 2013/0186484 | A1 | 7/2013 | Schwarzkopf et al. |
| 2013/0309622 | A1* | 11/2013 | Lindig .................... C03B 3/023 432/120 |
| 2014/0007622 | A1 | 1/2014 | Shock et al. |
| 2014/0190214 | A1 | 7/2014 | Huber et al. |
| 2015/0344343 | A1 | 12/2015 | Huber et al. |
| 2017/0066672 | A1 | 3/2017 | Huber |

\* cited by examiner

FURNACE SYSTEM

BACKGROUND a. Technical Field

This disclosure relates to furnace systems. In particular, the disclosure relates to a system for mixing raw material and cullet before delivery to a furnace and mechanisms for handling exhaust from a charger and other components of the system.

b. Background Art

In a glass melting furnace system, a charger is used to introduce raw materials into the furnace for melting. The construction of the charger is important because it has a significant influence on the melting process. For example, the construction of the charger determines the constitution and shape of unmelted materials discharged into the furnace and, therefore, the melting rate of those materials in the furnace. Differences in the melting rate can impact the operation and life of the furnace and the quality of the glass produced in the furnace.

Material introduced into the charger is often heated either within the charger itself or in a preheater. For example, a preheater is often used to preheat cullet (recycled broken glass) before the cullet is introduced into the charger and subsequently to the furnace. Because the cullet and raw materials within the charger typically have some water content, the heated mixture may generate steam. An efficient means for extracting this steam, and for maintaining the steam at a sufficient temperature to prevent condensation, is required in order to avoid damage from rusting of system components and from clogging the system when condensed steam combines with dust and other particulates.

The inventors herein have recognized a need for a furnace system that will minimize and/or eliminate one or more of the above-identified deficiencies.

BRIEF SUMMARY OF THE DISCLOSURE

This disclosure relates to furnace systems. In particular, the disclosure relates to a system for mixing batch material (raw material (e.g., silica sand, soda ash (sodium carbonate) and limestone) and cullet) before delivery to a furnace and mechanisms for handling exhaust from the charger and other components of the system.

A furnace system in accordance with one embodiment of the present teachings includes a furnace. The system further includes a mixing chamber defining an inlet end configured to receive separate streams of raw material and preheated cullet mix and an outlet end spaced from the inlet end and configured to discharge a combined stream of the raw material and the preheated cullet mix. The mixing chamber tapers from the inlet end to the outlet end. The mixing chamber defines first and second opposed sidewalls that approach one another moving from the inlet end to the outlet end. The mixing chamber further defines a first inlet in the inlet end configured to receive one of the raw material and the preheated cullet mix. The first inlet is aligned with an outlet in the outlet end along a vertical axis. The mixing chamber further defines a second inlet in the inlet end configured to receive the other of the raw material and the preheated cullet mix. The second inlet is offset from the outlet relative to the vertical axis such that the other of the raw material and the preheated cullet mix is deposited on the first sidewall before reaching the outlet. The system further includes a charger having an inlet end coupled to the outlet end of the mixing chamber and configured to receive the combined stream of the raw material and the preheated cullet mix and an outlet end through which a mixture of the raw material and the preheated cullet mix is discharged from the charger into a molten bath in a furnace.

A furnace system in accordance with another embodiment of the present teachings include a furnace. The system further includes a mixing chamber defining an inlet end configured to receive separate streams of raw material and preheated cullet mix and an outlet end spaced from the inlet end and configured to discharge a combined stream of the raw material and the preheated cullet mix. The mixing chamber tapers from the inlet end to the outlet end. The mixing chamber further defines a first inlet in the inlet end configured to receive one of the raw material and the preheated cullet mix. The mixing chamber further defines a second inlet in the inlet end configured to receive the other of the raw material and the preheated cullet mix. The system further includes a charger having an inlet end coupled to the outlet end of the mixing chamber and configured to receive the combined stream of the raw material and the preheated cullet mix and an outlet end through which a mixture of the raw material and the preheated cullet mix is discharged from the charger into a molten bath in a furnace. The furnace system further includes a duct system. The duct system includes an exhaust duct in fluid communication with an exhaust fluid outlet of the furnace and configured to vent fluid exhausted from the furnace and one or both of a mixing chamber exhaust duct in fluid communication with the mixing chamber and configured to vent fluid exhausted from the mixing chamber and a charger exhaust duct in fluid communication with the charger and configured to vent fluid exhausted from the charger. The mixing chamber exhaust duct and/or charger exhaust duct are also in fluid communication with the exhaust duct and the fluid exhausted from the mixing chamber and the charger is mixed with a portion of the fluid exhausted from the furnace.

A furnace system in accordance with the present teachings is advantageous relative to conventional furnace systems. In particular, the arrangement of the mixing chamber facilitates a beneficial constitution for the raw material and cullet mixture prior to entry into the furnace. The mixing of furnace exhaust with exhaust fluid from the mixing chamber and charger maintains an elevated temperature for the exhaust fluid and prevents condensation.

The foregoing and other aspects, features, details, utilities, and advantages of the disclosed system will be apparent from reading the following detailed description and claims, and from reviewing the accompanying drawings illustrating features of this system by way of example.

DETAILED DESCRIPTION

Figure 1:
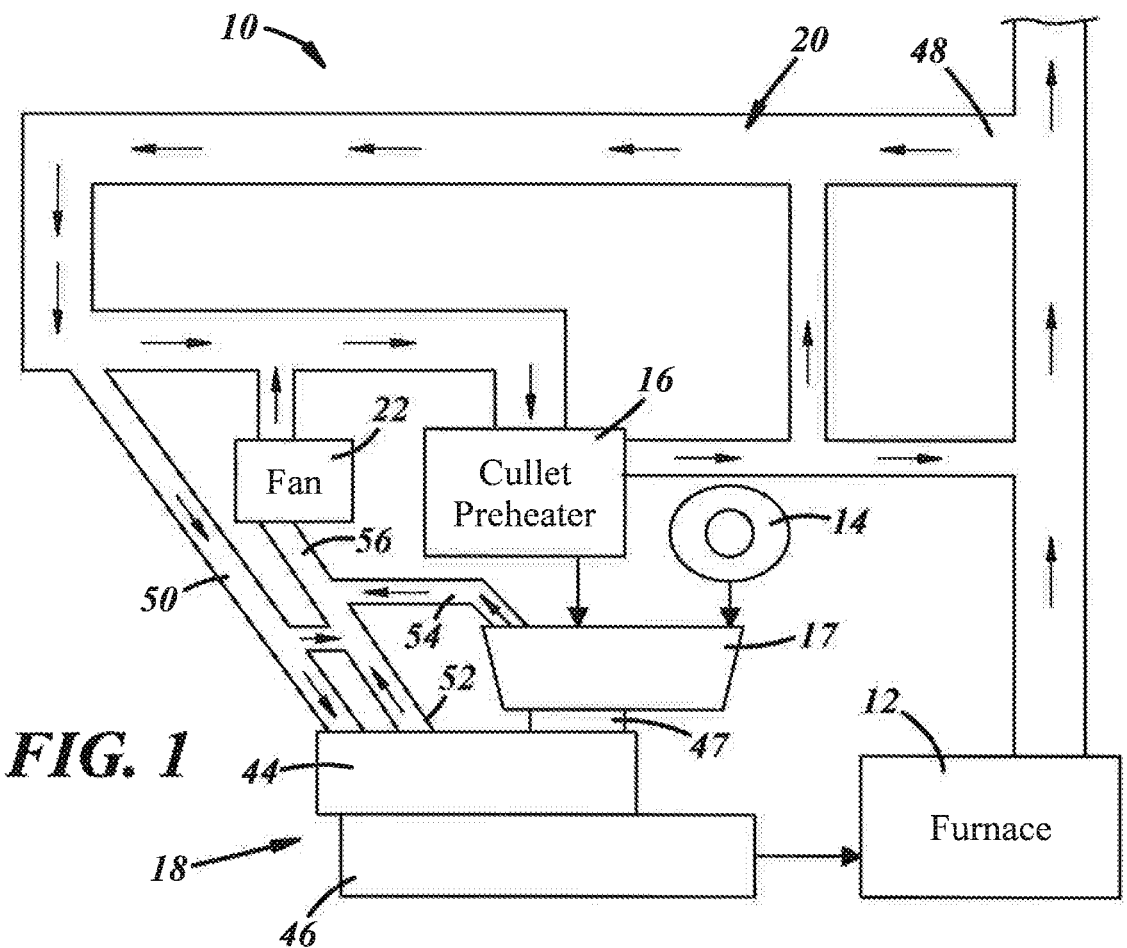
FIG. 1 is a schematic drawing of a furnace system in accordance with one embodiment of the present teachings.

Referring now to the drawings wherein like reference numerals are used to identify identical components in the various views, FIG. 1 illustrates a furnace system 10 in accordance with one embodiment of the present teachings. System 10 is provided to melt raw materials for use in forming objects or products. System 10 may comprise, for example, a glass melting furnace system for use in melting raw materials such as silica sand, soda ash (sodium carbonate), and limestone and cutlet (recycled broken glass) into molten glass. System 10 may include a furnace 12, a batch screw feeder 14, a preheater 16, a mixing chamber 17, a charger 18, a duct system 20 and a fan 22.

Furnace 12 is provided to melt batch materials. As noted above, in one embodiment furnace 12 may comprise a glass melting furnace that melts raw material such as silica sand, soda ash, and/or limestone and cutlet into molten glass. Furnace 12 may have an operating temperature of about 1565 degrees Celsius (2850 degrees Fahrenheit). Furnace 12 may generate heat using natural gas and preheated combustion air. Furnace 12 may also augment the heat using an electric boost system. Excess heat may be exhausted from furnace 12 through duct system 20.

Batch screw feeder 14 is provided to direct raw material (e.g., silica sand, soda ash and limestone) into mixing chamber 17. Although a screw feeder 14 is shown in the illustrated embodiment, it should be understood that a variety of mechanisms including chutes, conveyors and other structures may be used in addition to, or as an alternative to, screw feeder 14 to deliver raw material from one or more silos (not shown) to mixing chamber 17. Screw feeder 14 and/or other components of the batch delivery system may be controlled using conventional electromechanical controls that regulate the amount of raw material provided to mixing chamber 17 based on feedback signals from sensors used to monitor various conditions of the furnace 10, mixing chamber 17, or other structures in system 10.

Preheater 16 is provided to preheat materials before they are introduced into furnace 12 to improve the operating efficiency of furnace 12. In the glass melting furnace system referenced above, preheater 16 comprises a cullet preheater that is used to preheat cullet mix before the cutlet mix is provided to furnace 12. Cullet mix may contain only cullet or alternatively may contain a mix of cullet and one or more types of raw materials (e.g., cullet and silica sand). The preheater 16 may comprise a direct contact raining bed counterflow preheater in which cutlet mix is introduced at one end of the preheater and flows through the preheater around deflector plates under gravitational forces while heat is introduced into the opposite end of the preheater and flows in the opposite direction to the cullet mix. It should be understood, however, that other conventional forms of preheaters 16, for cullet mix, raw materials, or the like may alternatively be used in glass melting furnace systems.

Figure 3:
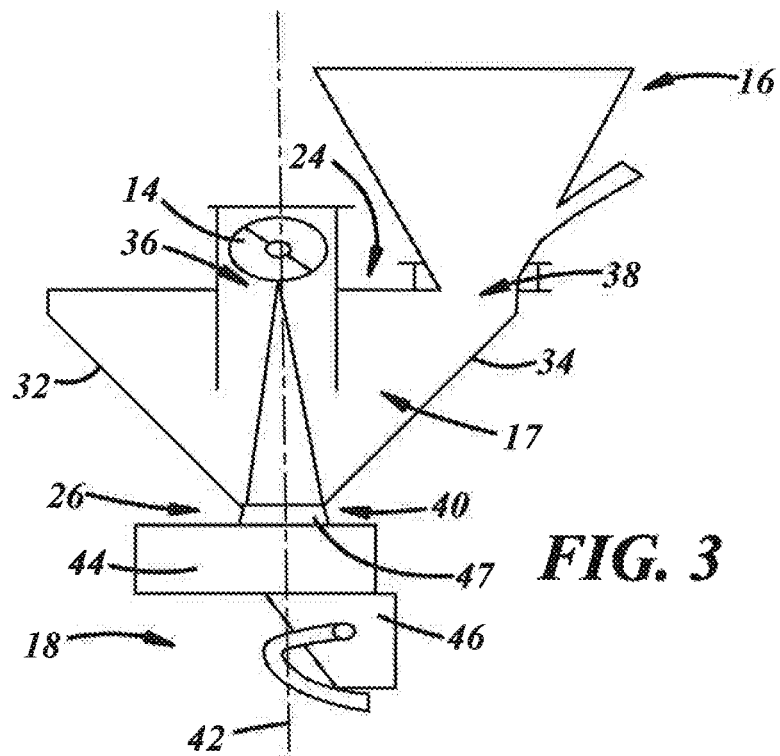
FIG. 3 is a schematic and cross-sectional drawing of a portion of the furnace system of FIGS. 1-2.
Figure 2:
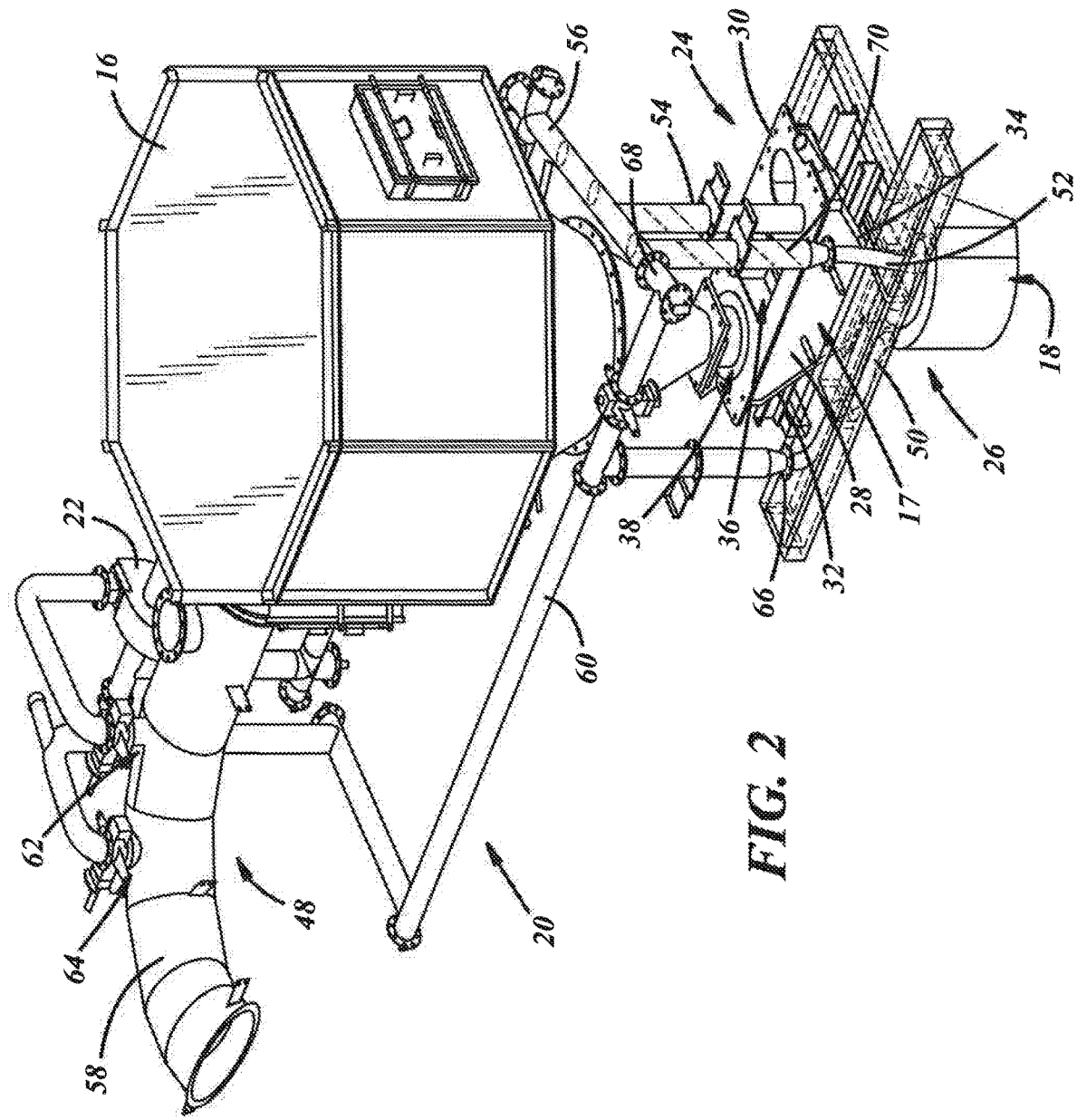
FIG. 2 is a perspective view of a portion of a furnace system in accordance with one embodiment of the present teachings.

Mixing chamber 17 is provided to combine streams of raw material from screw feeder 14 and cutlet mix from preheater 16 and to direct the combined stream into charger 18. Mixing chamber 17 defines an inlet end 24 and an outlet end 26. The inlet end 24 is configured to receive the separate streams of raw material and cullet mix from screw feeder 14 and preheater 16. The outlet end 26 is spaced from the inlet end 24 and is configured to discharge a combined stream of the raw material and cullet mix into charger 18. Mixing chamber 17 tapers from the inlet end 24 to the outlet end 26. Mixing chamber 17 includes two pairs of opposed sidewalls 28, 30 and 32, 34. Sidewalls 28, 30 are generally trapezoidal in shape, narrowing from the inlet end 24 of mixing chamber 17 to the outlet end 26. Sidewalls 32, 34 are generally rectangular in shape and join with sidewalls 28, 30. Sidewalls 32, 34 approach one another moving from the inlet end 24 of mixing chamber 17 to the outlet end 26. The angle of sidewalls 32, 34 may vary depending on the batch materials being used and, for example, may be between thirty degrees and eighty degrees from horizontal. Referring to FIG. 2, mixing chamber 17 may define multiple inlets at inlet end 24 including inlets 36, 38. Inlet 36 is configured to receive the raw material from screw feeder 14. Referring to FIG. 3, inlet 36 may be aligned with an outlet 40 formed in the outlet end 26 along a vertical axis 42. Inlet 38 is configured to receive cullet mix from preheater 16. Inlet 38, however, may be offset from outlet 40 relative to axis 42 such that cullet mix entering mixing chamber 17 through inlet 38 is deposited on one of sidewalls 32, 34 before reaching outlet 40. The configuration of inlets helps to facilitate an improved composition and mixing of the raw material and cullet mix. In an alternative embodiment, inlet 38 may be aligned with outlet 40 formed in the outlet end 26 along vertical axis 42 while inlet 36 is offset from outlet 40 relative to axis 42 such that raw material entering mixing chamber 17 through inlet 36 is deposited on one of sidewalls 32, 34 before reaching outlet 40.

Charger 18 is provided to feed a mixture of raw material and cullet mix into furnace 12. Referring to FIGS. 1 and 3, charger 18 may include a hopper 44 and a feeder 46. Hopper 44 is provided to receive mixed raw material and cullet mix from mixing chamber 17 and provide the mixture to feeder 46 for delivery to furnace 12. Hopper 44 has an inlet end coupled to the outlet end 26 of mixing chamber 17. The inlet end is configured to receive the combined stream of raw material and cullet mix from mixing chamber 17. Feeder 46 has an outlet end through which the mixture of the raw material and the cullet mix is discharged from the charger 18 into a molten bath in furnace 12. In accordance with one aspect of the illustrated embodiment, at least a portion of charger 18—such as hopper 44—may be configured to rotate about an axis such as axis 42 in order to facilitate mixing of the raw material and cullet mix. In particular, hopper 44 may oscillate about axis 42. A seal 47 may be disposed between the outlet end 26 of mixing chamber 17 and the inlet end of hopper 44 of charger 18 to prevent steam from escaping.

Duct system 20 is provided to route fluids between furnace 12, preheater 16, mixing chamber 17, charger 18 and other components (not shown) of system 10 as well as the atmosphere (for air intake and byproduct exhaustion). System 20 is made from materials sufficient to withstand the anticipated operating temperatures of the components of system 10 and may be made from steel in some embodiments. Mechanically or electrically controlled valves (not shown) may be disposed within duct system 20 to control the amount of fluid flowing to and from various components of furnace system 12. Referring to FIGS. 1-2, system 20 may include an exhaust duct 48, a charger intake duct 50, a charger exhaust duct 52, a mixing chamber exhaust duct 54, and a return duct 56. It should be understood, however, that additional ducts may form a part of duct system 20.

Exhaust duct 48 is configured to vent fluid exhausted from furnace 12. In the illustrated embodiment, exhaust duct 48 is further configured to direct portions of the fluid exhausted from furnace 12 to other components of system 10 for use in preheating materials before introduction to furnace 12. Referring to FIG. 2, in the illustrated embodiment, exhaust duct 48 may comprise several members including a primary duct member 58 and one or more secondary duct members 60 that branch off from the primary duct member 58.

Primary duct member 58 may be relatively wide (and may be wider than the secondary duct members 60) and defines a fluid inlet (not shown) in fluid communication with an exhaust fluid outlet in furnace 12. In the illustrated embodiment, member 58 is coupled to preheater 16 and defines a fluid outlet in fluid communication with a fluid inlet of preheater 16 through which a portion of the fluid exhausted from furnace 12 is directed into preheater 16 for use in heating the cullet mix in preheater 16. Primary duct member 58 may also define additional fluid inlets or outlets configured to receive fluid from other sources or direct fluid to other destinations. For example, member 58 may define a fluid inlet in communication with a source of fluid having a lower temperature than the fluid exhausted by furnace 12 in order to reduce or dilute the temperature of the fluid exhausted by furnace 12. One inlet may, for example deliver exhaust fluid from preheater 16 to primary duct member 58. In the illustrated embodiment, primary duct member 58 includes an inlet 62 located upstream of preheater 16 that is configured to receive fluid from return duct 56 as discussed in greater detail below. An outlet 64 located even further upstream is connected to a secondary duct member 60.

Secondary duct members 60 route portions of the exhaust fluid flowing through primary duct member 58 to various locations in system 10. For example, a secondary duct member (not shown) may vent a portion of the fluid exhausted from furnace 12 to atmosphere. In accordance with one aspect of the illustrated embodiment, a secondary duct member 60 has a fluid inlet in fluid communication with fluid outlet 64 of primary duct member 58 and itself branches to form a pair of fluid outlets 66, 68 used to deliver portions of the exhaust fluid to hopper 44 of charger 18 and to return duct 56. In particular, member 60 is configured to deliver a portion of the furnace exhaust fluid to charger intake duct 50 for use in heating the mixture of raw material and cutlet mix in charger 18. Member 60 is also configured to deliver another portion of the furnace exhaust fluid to return duct 56 for use in heating the fluid exhausted from the mixing chamber 17 and charger 18 in order to maintain those fluids above a predetermined temperature and prevent condensation.

Charger intake duct 50 is provided to direct a portion of the fluid exhausted from furnace 12 into hopper 44 of charger 18 for use in preheating the mixture of raw material and cullet mix in charger 18 and/or maintaining the temperature of the mixture. Duct 50 includes an inlet end with an inlet in fluid communication with exhaust duct 48 (and, in particular, outlet 66 of secondary duct member 60 of exhaust duct 48) and an outlet end with an outlet in fluid communication with hopper 44. Duct 50 therefore delivers a portion of the fluid exhausted from furnace 12 to charger 18. In some embodiments, at least a portion of duct 50 may comprise a flexible hose such that the outlet end is configured for movement relative to the inlet end upon rotation or other movement of the charger 18. Exhaust duct 48, charger intake duct 50, or a branch thereof may additionally deliver a portion of the fluid exhausted from furnace 12 to mixing chamber 17 in order to further heat the raw material and preheated cullet mix prior to introduction of the materials into furnace 12. Such further heating of the raw material and cutlet mix in the mixing chamber 17 may occur via directly introducing fluid exhausted from furnace 12 into mixing chamber 17. Alternatively, such heating could occur by routing fluid exhausted from furnace 12 around the exterior of mixing chamber 17 thereby heating mixing chamber and thus the raw material and cullet mix contained therein from the outside. Persons of ordinary skill in the art will recognize that heating the contents of the preheater 16, mixing chamber 17 and/or charger 18 may be augmented with, or heated entirely by, heating sources separate from the fluid exhausted by furnace 12, such as electric heating sources. Such electric heating sources may include heat tracing devices((described in greater detail hereinbelow) that are disposed against a portion or all of the preheater 16, mixing chamber 17 and/or charger 18, including exterior walls of the preheater 16, mixing chamber 17 and/or charger 18.

Charger exhaust duct 52 and mixing chamber exhaust duct 54 are provided to vent fluid exhausted from hopper 44 of charger 18 and from mixing chamber 17, respectively. Charger exhaust duet 52 includes an inlet end with an inlet in fluid communication with an outlet of hopper 44 of charger 18 and an outlet end with an outlet in fluid communication with an inlet of return duct 56. Similar to charger intake duct 50, at least a portion of charger exhaust duct 52 may comprise a flexible hose such that the inlet end is configured for movement relative to the outlet end upon rotation or other movement of the charger 18. Mixing chamber exhaust duct 54 includes an inlet end with an inlet in fluid communication with an outlet of mixing chamber 17 and an outlet end with an outlet in fluid communication with another inlet of return duct 56. The fluid exhausted from charger 18 and mixing chamber 17 cools as it travels away from the charger 18 and mixing chamber 17. Because the cullet mix and raw materials in the charger 18 and mixing chamber 17 have some water content, the exhausted fluid or steam may condense if the temperature of the fluid falls below a predetermined temperature as it cools. In accordance with one aspect of the illustrated system, exhaust fluid from furnace 12 is combined with the exhaust fluid of charger 18 and mixing chamber 17 in order to maintain the temperature of the fluid mixture above a predetermined temperature in the return duct and prevent condensation. As a result, the system prevents rusting and clogging of system components that results when condensation mixes with dust and other particulates. The amount of exhaust fluid from furnace 12 that is mixed with the exhaust fluid of charger 18 and mixing chamber 17 may be varied over time using valves in secondary duct member 60 that are electronically controlled by a programmable controller acting in response to signals generated by sensors monitoring various conditions associated with the fluid flow of the mixture such as a temperature of the fluid flow.

In addition, or in the alternative, to combining a portion of the furnace exhaust fluid with the mixing chamber and/or hopper exhaust fluid, furnace system 10 may further include a heat tracing device 70 disposed against a portion or all of one or both of the charger exhaust duct 52 and mixing chamber exhaust duct 54. Device 70 may further be disposed against a portion or all of return duct 56. Device 70 may comprise a high-resistance conductive wire or cable that generates heat as a result of resistance to current flow. Alternatively, device 70 may comprise a low-resistance conductive wire or cable that transmits current to electric heating elements spaced along the length of the wire or cable. Device 70 may be self-regulating in that it varies the heat output based on system requirements (e.g. by feedback from temperature sensors) or may deliver a constant heat output. Insulation may overlay device 70 to direct generated heat inward towards ducts 52, 54, 56. Device 70 may be wound about a portion of some or all of ducts 52, 54, 56 and transfers heat through the walls of the ducts 52, 54, 56 which are made of thermally conductive materials. In this manner, device 70 maintains a temperature of the fluid exhausted from the charger 18 and mixing chamber 17 above a predetermined temperature to prevent condensation. As noted above, similar heat tracing devices may be added to exterior walls of the preheater 16, mixing chamber 17 and/or charger 18 to further assist in the heating of the raw material and/or cullet mix and/or maintenance of temperature in system 10 to prevent condensation.

Return duct 56 is provided to route exhaust fluid from charger 18 and mixing chamber 17 back to the exhaust duct 48. Return duct 56 has an inlet end with inlets coupled to secondary duct member 60 of exhaust duct 48, charger exhaust duct 52 and mixing chamber exhaust duct 54 and is configured to receive the fluid exhausted from the charger 18 and mixing chamber 17 and mix that fluid with a portion of the fluid exhausted from furnace 12. Return duct 56 further has an outlet end with an outlet in fluid communication with an inlet 62 of exhaust duct 48 and through which the mixture of fluids from secondary duct member 60 of exhaust duct 48, charger exhaust duct 52 and mixing chamber exhaust duct 54 are provided to primary duct member 58 of exhaust duct 48.

Fan 22 is provided to draw the mixture of fluid in return duct 56 into primary duct member 58 of exhaust duct 48. In the illustrated embodiment, fan 22 is mounted on primary duct member 58 proximate the outlet end of return duct 56 of duct system 20.

A furnace system 10 in accordance with the present teachings is advantageous relative to conventional furnace systems. In particular, the arrangement of the mixing chamber 17 facilitates a beneficial constitution for the raw material and cullet mixture prior to entry into the furnace 12. The mixing of furnace exhaust with exhaust fluid from the charger's hopper 44 and mixing chamber 17 maintains an elevated temperature for the exhaust fluid and prevents condensation.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

What is claimed is:

1. A furnace system, comprising:
    a furnace; and,
    a mixing chamber defining an inlet end configured to receive separate streams of raw material and preheated cullet mix and an outlet end spaced from the inlet end and configured to discharge a combined stream of the raw material and the preheated cullet mix, the mixing chamber tapering from the inlet end to the outlet end and defining first and second opposed sidewalls that approach one another moving from the inlet end to the outlet end, the mixing chamber defining a first inlet in the inlet end configured to receive one of the raw material or the preheated cullet mix, the first inlet aligned with an outlet in the outlet end along a vertical axis, the mixing chamber further defining a second inlet in the inlet end configured to receive the other of the raw material or the preheated cullet mix, the second inlet offset from the outlet relative to the vertical axis such that the other of the raw material and the preheated cullet mix is deposited on the first sidewall before reaching the outlet; and,
    a charger including a hopper and a feeder, the hopper having an inlet end coupled to the outlet end of the mixing chamber and configured to receive the combined stream of the raw material and the preheated cullet mix, and the feeder having an outlet end through which a mixture of the raw material and the preheated cullet mix is discharged from the charger into a molten bath in a furnace.

2. The furnace system of claim 1 wherein the charger is configured to rotate about the vertical axis.

3. The furnace system of claim 2 wherein the charger is configured to oscillate about the vertical axis.

4. The furnace system of claim 1, further comprising a duct system including
    an exhaust duct in fluid communication with an exhaust fluid outlet of the furnace and configured to vent fluid exhausted from the furnace, and,
    a charger intake duct in fluid communication with the charger and the exhaust duct and configured to deliver a portion of the fluid exhausted from the furnace to the charger.

5. The furnace system of claim 4 wherein the charger intake duct comprises a flexible hose having an inlet end coupled to the exhaust duct and an outlet end coupled to the charger, the outlet end configured for movement relative to the inlet end upon rotation of the charger.

6. The furnace system of claim 1, further comprising a duct system including
    an exhaust duct in fluid communication with an exhaust fluid outlet of the furnace and configured to vent fluid exhausted from the furnace, and,
    a charger exhaust duct in fluid communication with the charger and configured to vent fluid exhausted from the charger, the charger exhaust duct also in fluid communication with the exhaust duct wherein the fluid exhausted from the charger is mixed with a portion of the fluid exhausted from the furnace.

7. The furnace system of claim 6 wherein the charger exhaust duct comprises a flexible hose having an inlet end coupled to the charger and an outlet end, the inlet end configured for movement relative to the outlet end upon rotation of the charger.

8. The furnace system of claim 6 wherein the duct system further includes a return duct having an inlet end coupled to the exhaust duct and the charger exhaust duct and configured to receive the fluid exhausted from the charger and another portion of the fluid exhausted from the furnace and an outlet end coupled to the exhaust duct and configured to return a mixture of the fluid exhausted from the charger and the another potion of the fluid exhausted from the furnace to the exhaust duct.

9. The furnace system of claim 1, further comprising
    a duct system including a charger exhaust duct in fluid communication with the charger and configured to vent fluid exhausted from the charger; and,
    a heat tracing device disposed against a portion of the charger exhaust duct and configured to maintain a temperature of the fluid exhausted from the charger above a predetermined temperature.

10. The furnace system of claim 9 wherein the heat tracing device is wound about the charger exhaust duct.

11. The furnace system of claim 1, further comprising a duct system including
    an exhaust duct in fluid communication with an exhaust fluid outlet of the furnace and configured to vent fluid exhausted from the furnace, and,
    a mixing chamber exhaust duct in fluid communication with the mixing chamber and configured to vent fluid exhausted from the mixing chamber, the mixing chamber exhaust duct also in fluid communication with the exhaust duct wherein the fluid exhausted from the mixing chamber is mixed with a portion of the fluid exhausted from the furnace.

12. The furnace system of claim 11 wherein the duct system further includes a return duct having an inlet end coupled to the exhaust duct and the mixing chamber exhaust duct and configured to receive the fluid exhausted from the mixing chamber and another portion of the fluid exhausted from the furnace and an outlet end coupled to the exhaust duct and configured to return a mixture of the fluid exhausted from the mixing chamber and the another potion of the fluid exhausted from the furnace to the exhaust duct.

13. The furnace system of claim 1, further comprising
a duct system including a mixing chamber exhaust duct in fluid communication with the mixing chamber and configured to vent fluid exhausted from the mixing chamber; and,
a heat tracing device disposed against a portion of the mixing chamber exhaust duct and configured to maintain a temperature of the fluid exhausted from the mixing chamber above a predetermined temperature.

14. The furnace system of claim 13 wherein the heat tracing device is wound about the mixing chamber exhaust duct.

15. The furnace system of claim 1, further comprising:
a screw feeder to direct raw material into the mixing chamber, at the inlet end of the mixing chamber; and
a preheater to preheat cullet and configured to deposit cullet on the first sidewall of the mixing chamber;
wherein the charger is located below the mixing chamber.

16. A furnace system, comprising:
a furnace;
a mixing chamber defining an inlet end configured to receive separate streams of raw material and preheated cullet mix and an outlet end spaced from the inlet end and configured to discharge a combined stream of the raw material and the preheated cullet mix, the mixing chamber tapering from the inlet end to the outlet end, the mixing chamber defining a first inlet in the inlet end configured to receive one of the raw material or the preheated cullet mix, the mixing chamber further defining a second inlet in the inlet end configured to receive the other of the raw material or the preheated cullet mix;
a charger having an inlet end coupled to the outlet end of the mixing chamber and configured to receive the combined stream of the raw material and the preheated cullet mix and an outlet end through which a mixture of the raw material and the preheated cullet mix is discharged from the charger into a molten bath in a furnace; and,
a duct system comprising
an exhaust duct in fluid communication with an exhaust fluid outlet of the furnace and configured to vent fluid exhausted from the furnace,
at least one of a mixing chamber exhaust duct in fluid communication with the mixing chamber and configured to vent fluid exhausted from the mixing chamber or a charger exhaust duct in fluid communication with the charger and configured to vent fluid exhausted from the charger,
wherein a charger intake duct is in fluid communication with the exhaust duct and configured to deliver a portion of the fluid exhausted from the furnace to the charger; wherein the charger exhaust duct is in fluid communication with the exhaust duct where the fluid exhausted from the charger is mixed with a portion of the fluid exhausted from the furnace; and wherein the mixing chamber exhaust duct is in fluid communication with the exhaust duct where the fluid exhausted from the mixing chamber is mixed with a portion of the fluid exhausted from the furnace.

17. The furnace system of claim 16 wherein the first inlet is aligned with an outlet in the outlet end along a vertical axis and the second inlet is offset from the outlet relative to the vertical axis such that the other of the raw material and preheated cullet mix is deposited on a first sidewall of the mixing chamber before reaching the outlet.

18. The furnace system of claim 16 wherein the duct system further comprises a return duct having an inlet end coupled to the exhaust duct and one or both of the mixing chamber exhaust duct and the charger exhaust duct and configured to receive the portion of the fluid exhausted from the furnace and the fluid exhausted from the mixing chamber and/or the fluid exhausted from the charger and an outlet end coupled to the exhaust duct and configured to return a mixture of the portion of the fluid exhausted from the furnace and the fluid exhausted from the mixing chamber and/or the fluid exhausted from the charger to the exhaust duct.

19. The furnace system of claim 18, further comprising a preheater for the preheated cullet mix having an outlet coupled to the mixing chamber, the preheater including a fluid inlet coupled to the exhaust duct and configured to receive the mixture from the return duct.

20. The furnace system of claim 16 wherein the charger is configured to rotate about the vertical axis.

21. The furnace system of claim 20 wherein the charger exhaust duct comprises a flexible hose having an inlet end coupled to the charger and an outlet end, the inlet end configured for movement relative to the outlet end upon rotation of the charger.

* * * * *